(12) United States Patent  
Legrand

(10) Patent No.: US 7,265,685 B2  
(45) Date of Patent: Sep. 4, 2007

(54) POSITION SENSOR WITH COMPENSATED MAGNETIC POLES

(75) Inventor: Bertrand Legrand, Grenoble (FR)

(73) Assignee: Electricfil Automotive, Miribel (FR)

( * ) Notice: Subject to any disclaimer, the term of this patent is extended or adjusted under 35 U.S.C. 154(b) by 0 days.

(21) Appl. No.: 11/349,336

(22) Filed: Feb. 8, 2006

(65) Prior Publication Data

US 2006/0186879 A1    Aug. 24, 2006

(30) Foreign Application Priority Data

Feb. 11, 2005    (FR) .................................. 05 01380

(51) Int. Cl.  
*H03M 1/22* (2006.01)

(52) U.S. Cl. ........................................................ 341/15

(58) Field of Classification Search .................. 341/13, 341/15, 11  
See application file for complete search history.

(56) References Cited

U.S. PATENT DOCUMENTS 6,400,143 B1 *    6/2002    Travostino et al. .... 324/207.22

FOREIGN PATENT DOCUMENTS

| DE | 19758037 | 7/1998 |
|---|---|---|
| DE | 19800774 | 7/1999 |
| DE | 10017542 | 10/2001 |
| EP | 1130362 | 9/2001 |

* cited by examiner

*Primary Examiner*—Peguy JeanPierre  
(74) *Attorney, Agent, or Firm*—Dennison, Schultz & MacDonald

(57) ABSTRACT

The object of the invention relates to an encoder for a rotary position sensor, including a multipolar magnetic ring driven into rotation around its axis, and provided at its circumference with magnetic poles of a given sign, alternately positioned with magnetic poles of an opposite sign, so as to form at least one series of pairs of magnetic poles with a determined period, each magnetic pole of a given sign having a width $I_i$ and a magnetic polarisation value $M_i$ whereas each magnetic pole of opposite sign has a width $I_{i+1}$ different from width $I_i$ and a magnetic polarisation value $M_{i+1}$, characterized in that the polarization of the magnetic poles is such that $M_i \times I_i = M_{i+1} \times I_{i+1}$.

13 Claims, 1 Drawing Sheet

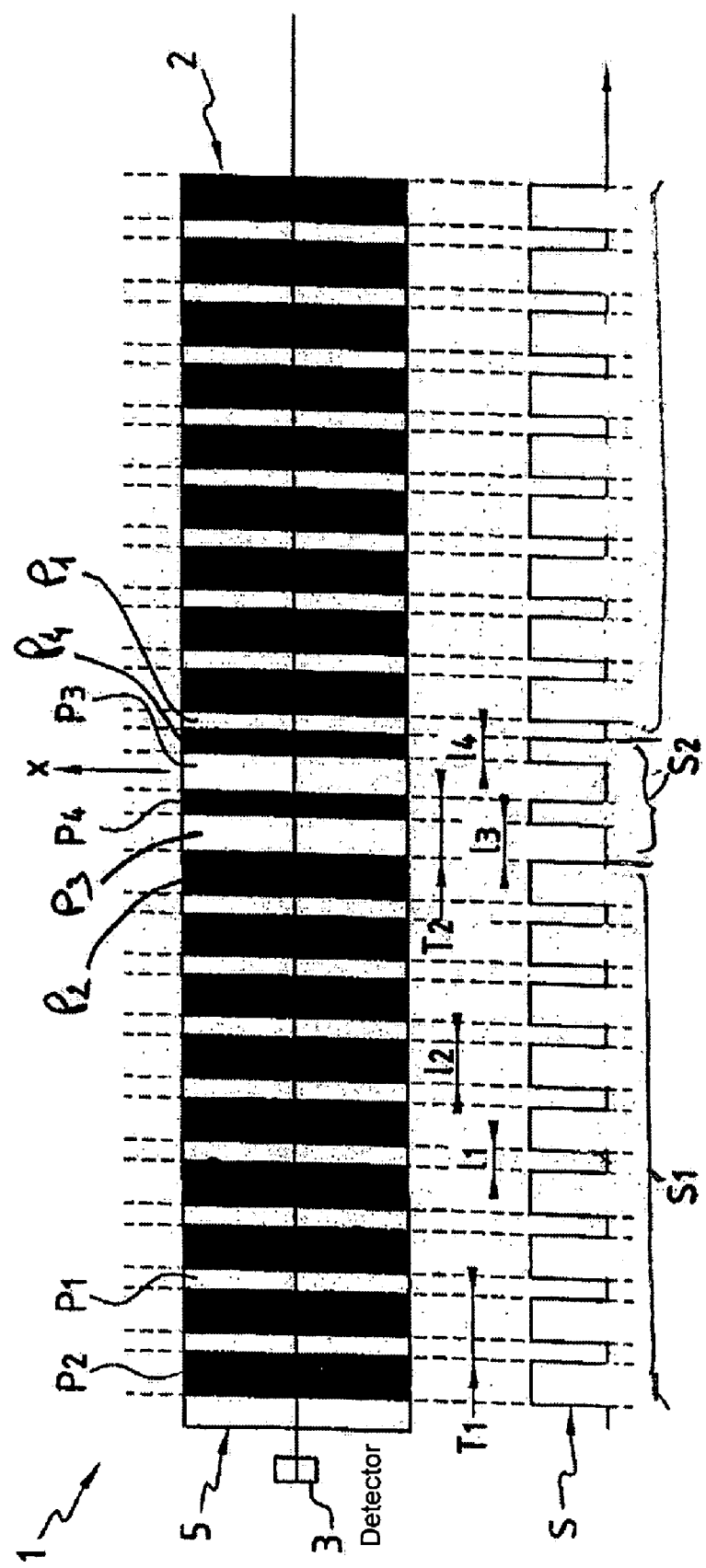

POSITION SENSOR WITH COMPENSATED MAGNETIC POLES

BACKGROUND OF THE INVENTION

The present invention relates to the technical field of rotary magnetic sensors of the type including an encoder component moving near a detector cell and suitable for locating at least one angular position, in the broadest sense.

The object of the invention finds a particularly advantageous application in the automotive field where such a sensor may be used, for example within the framework of ignition functions.

In the preferred field above, it is known how to apply a suitable magnetic sensor for measuring the change in the strength of a magnetic field, when an encoder provided with a series of components generating a variable magnetic field, moves past one or more measuring or detector cells. Each detector cell, such as for example a Hall effect or magneto-resistive probe, delivers a periodic electrical signal corresponding to the change in the strength of the magnetic field generated by the components. Each detector cell is associated with a level comparator with hysteresis, such as a Schmitt trigger, in order to obtain clear transitions of the output voltage for distinct values of the magnetic field, according to whether it varies by increasing or decreasing its value.

In order to form a sensor for detecting a velocity of rotation, it is known how to make an encoder provided with components generating a variable magnetic field, regularly laid out along a circumference.

According to a first embodiment, the generating components consist of components which perturb a magnetic field created by a fixed magnet placed near such perturbing components. For example, such perturbing components are formed by teeth provided in a ferromagnetic ring.

According to a second embodiment, the components generating a variable magnetic field are formed by magnetic poles, regularly spaced out according to a given pitch. Such an encoder thus appears as a multipolar magnetic ring.

In order to be able to determine at least one position, for example corresponding to the top dead centre for igniting a cylinder, it is known how to produce a singularity on the magnetic encoder commonly called a singular or irregular pole. Thus, for example, it is known how to suppress two teeth on the ferromagnetic ring. In the alternative embodiment applying an encoder made as a multipolar magnetic ring, suppressing several magnetic poles by leaving a remaining empty space, or replacing one or several poles of a given sign with one or several poles of an opposite sign, may be contemplated. A given magnetization pole is thereby achieved, which between both of its adjacent poles with an opposite sign, has a gap pitch different from the gap pitch of the other poles.

Under certain conditions of use, there also occurs the need of making regular magnetic poles with different gap pitches in order to obtain a signal with a cyclic ratio different from 0.5. Generally, it should be noted that the making of an encoder with magnetic poles having different gap pitches, i.e., with magnets of different sizes, leads to magnetic instability causing a lack of accuracy in the detection of the positions.

SUMMARY OF THE INVENTION

The object of the invention therefore aims at finding a remedy to the drawbacks of the prior art by proposing a magnetic sensor with which, although including magnetic poles with various gap pitches, a measuring signal may be obtained without any magnetic drift.

In order to achieve this goal, the object of the invention relates to a sensor including a multipolar magnetic ring driven into rotation about its axis, and provided on its circumference with magnetic poles of a given sign, alternately positioned with magnetic poles of an opposite sign so as to form at least one series of at least one pair of magnetic poles with a determined period, each magnetic pole of a given sign having a width $I_i$ and a magnetic polarization value $M_i$ whereas each magnetic pole of opposite sign has a width $I_{i+1}$ different from the width $I_i$ and a magnetic polarization value $M_{i+1}$. According to the invention, the polarization of the magnetic poles is such that $M_i \times I_i = M_{i+1} \times I_{i+1}$.

According to a first exemplary embodiment, the encoder includes as magnetic poles, regular magnetic poles of a given sign and regular magnetic poles of an opposite sign so as to form one series of pairs of regular magnetic poles with a determined period, each regular magnetic pole of a given sign having a width $I_1$ and a magnetic polarization value $M_1$ whereas each regular magnetic pole of opposite sign has a width $I_2$ different from the width $I_1$ and a magnetic polarization value $M_2$ so that $M_1 \times I_1 = M_2 \times I_2$.

According to this exemplary embodiment, it should be noted that the encoder may also include as magnetic poles, at least one magnetic singularity formed by at least one irregular magnetic pole of a given sign having a width $I_3$ and a magnetic polarization value $M_3$ and by an irregular magnetic pole of opposite sign having a width $I_4$ substantially equal to width $I_3$ and a magnetic polarization value $M_4$ so as to form a series of at least one pair of irregular magnetic poles with a determined period, the polarization of the irregular magnetic poles being such that: $M_3 \times I_3 = M_4 \times I_4$.

According to a second exemplary embodiment applied as a combination or independently with the first exemplary embodiment, the encoder has, as magnetic poles, at least one magnetic singularity formed by at least one irregular magnetic pole of a given sign having a width $I_3$ and a magnetic polarization value $M_3$ and by an irregular magnetic pole of opposite sign having a width $I_4$ different from the width $I_3$ and a magnetic polarization value $M_4$ so as to form a series of at least one pair of irregular magnetic poles with a determined period, the polarization of the irregular magnetic poles being such that: $M_3 \times I_3 = M_4 \times I_4$.

According to this exemplary embodiment, it should be noted that the encoder may also include, as magnetic poles, regular magnetic poles of a given sign and regular magnetic poles of an opposite sign so as to form a series of pairs of regular magnetic poles with a determined period, each regular magnetic pole of a given sign having a width $I_1$ and a magnetic polarization value $M_1$ whereas each regular magnetic pole of opposite sign has a width $I_2$ substantially equal to width $I_1$ and a magnetic polarization value $M_2$ such that $M_1 \times I_1 = M_2 \times I_2$.

According to a preferred alternative embodiment, the regular and irregular magnetic poles are such that: $M_1 \times I_1 = M_2 \times I_2 = M_3 \times I_3 = M_4 \times I_4$.

Advantageously, the regular magnetic pole is of the same sign as the irregular magnetic pole whereas the regular magnetic pole and the irregular magnetic pole are of the same sign, opposite to the sign of the poles.

According to a preferred alternative embodiment, the regular and irregular magnetic poles are such that $I_1 + I_2 = I_3 + I_4$, so that the period of the regular magnetic poles is equal to the period of the irregular magnetic poles.

According to another preferred alternative embodiment, the width $I_1$ of the regular magnetic pole is equal to the width $I_4$ of the irregular magnetic pole whereas the width $I_2$ of the magnetic pole is equal to the width $I_3$ of the irregular magnetic pole so that the cyclic ratios for the regular and irregular magnetic poles are complementary.

Another object of the invention is to propose a rotary position sensor including an encoder according to the invention, the multipolar magnetic ring moving past at least one detector cell.

According to a particularly advantageous application, the encoder is blocked in rotation on a shaft of an engine of a motor vehicle.

Preferably, the detector cell is a monocomponent detector cell.

For example, the detector cell is a Hall effect cell, a differential Hall effect cell, a Hall effect cell with flux concentrator, a magneto-resistive cell or a giant magneto-resistive cell.

BRIEF DESCRIPTION OF THE DRAWING

Various other features will become apparent from the description made below with reference to the single appended FIGURE which shows schematically as a non-limiting example, a sensor according to an embodiment of the invention.

DESCRIPTION OF THE PREFERRED EMBODIMENTS

The unique FIGURE illustrates an exemplary embodiment of a magnetic rotation sensor 1 including a rotary magnetic encoder 2 driven into rotation around an axis x by all suitable means. The encoder 2 which is formed as a multipolar magnetic ring is intended to move past at least one fixed detector cell 3 connected to logical processing means, not shown but known per se, which deliver a digital output signal S. It should be considered that a detector cell 3 comprises at least one component sensitive to the variable magnetic field. Preferably, the detector cell 3 is a monocomponent detector cell, i.e., a cell delivering a unique signal which is a direct image of the detected variable magnetic field. This monocomponent cell differs from a so-called differential cell which delivers a single signal resulting from the subtraction of two signals each corresponding to the change in the variable magnetic field taken at two different locations. The detector cell 3 is a Hall effect cell, a differential Hall effect cell, a Hall effect cell with flux concentrator, a magneto-resistive cell, a giant magneto-resistive cell.

Advantageously, the detector cell 3 and the logical processing means form an integral part of an electronic microcircuit.

The encoder 2 on its circumference is provided with a magnetic track 5 intended to move past the cell 3. The magnetic track 5 includes, in the illustrated example, regular magnetic poles $P_1$ of a given sign for example north, alternately positioned with regular magnetic poles $P_2$ of opposite sign, i.e., south, in the illustrated example. The regular magnetic poles $P_1$, $P_2$ are distributed so as to form $N_1$ pairs of poles ($N_1$=58 pairs for example) each with a same period $T_1$ and a regular magnetic north pole $P_1$ and a regular magnetic south pole $P_2$.

The detector cell 3 delivers an electrical signal corresponding to the change in the magnetic field of the track 5 moving past the cell during rotation of the encoder 2. The signals delivered by the cell 3 are processed by processing means, in order to obtain a digital signal S corresponding to each alternation of the north and south poles of the track. For example, signals delivered by cell 3 are compared with predetermined electrical thresholds, so as to obtain the digital output signal S.

Each regular north magnetic pole $P_1$ has a magnetic polarization value $M_1$ and a width $I_1$ taken after considering the displacement direction of the encoder, i.e., in the tangential direction to the encoder. Also, each regular south magnetic pole $P_2$ has a magnetic polarization value $M_2$ and a width $I_2$ different from width $I_1$.

According to the invention, polarization of the regular magnetic poles $P_1$, $P_2$ is such that $M_1 \times I_1 = M_2 \times I_2$.

Insofar that width $I_1$ is different from width $I_2$, the polarization of the regular magnetic poles $P_1$, $P_2$ is also different. In other words, the regular magnetic poles of larger volume are lower in polarization than the other ones. For example, if width $I_1$ accounts for 30% of the total width of a pair of regular magnetic poles ($I_2$=70% of this width) then each north magnetic pole $P_1$ has a magnetic polarization value $M_1$ and each south magnetic pole $P_2$ has a value $M_2$ equal to $3/7$ of $M_1$. Advantageously, but not exclusively, the magnetic polarization value $M_1$ is equal to the saturated polarization value $B_{max}$ so that $M_2 = 3/7$ of $B_{max}$.

Of course, it is considered that the thickness of the magnetic poles $P_1$, $P_2$ taken along the radius, i.e., along the direction perpendicular to the width and to the axis x, is constant at least at the section moving past the cell 3.

With this magnetic compensation between the regular magnetic poles $P_1$, $P_2$, it is possible to avoid magnetic instability, i.e. stabilize the signal at right angles of each transition.

It should be noted that the regular magnetic poles $P_1$, $P_2$ with different widths result in a digital output signal S including a regular portion $S_1$ with an unbalanced cyclic ratio $R_1$. A cyclic ratio is considered to be unbalanced if it has a value different from 0.5, i.e., if, over one period, the high signal time is different from the low signal time.

In the preferred illustrated exemplary embodiment, the multipolar magnetic ring includes at least one magnetic singularity formed by at least one irregular magnetic pole $P_3$ of a given sign for example north, and by at least one irregular magnetic pole $P_4$ of opposite sign for example south, in the illustrated example. The irregular magnetic poles $P_3$, $P_4$ are distributed so as to form $N_2$ pairs of poles ($N_2$=2 in the illustrated example) each with a same period $T_2$ and an irregular north magnetic pole $P_3$ and an irregular south magnetic pole $P_4$.

Each irregular north magnetic pole $P_3$ has a magnetic polarization value $M_3$ and a width $I_3$. Also, each irregular south magnetic pole $P_4$ has a magnetic polarization value $M_4$ and a width $I_4$ which, in the illustrated example is different from width $I_3$. These irregular magnetic poles $P_3$, $P_4$ result in a digital output signal S with an irregular portion $S_2$ of cyclic ratio $R_2$.

According to the invention, the polarization of the irregular magnetic poles $P_3$, $P_4$ is such that $M_3 \times I_3 = M_4 \times I_4$.

As in the case of regular magnetic poles $P_1$, $P_2$, the polarization of irregular magnetic poles $P_3$, $P_4$ is different. Of course, the thickness of the irregular magnetic $P_3$, $P_4$ taken along the radius is constant.

Advantageously, and in order to maintain magnetic equilibrium over the whole periphery of the encoder, the magnetic poles $P_1$-$P_4$ are defined such that:

$$M_1 \times I_1 = M_2 \times I_2 = M_3 \times I_3 = M_4 \times I_4.$$

Preferably, $I_1+I_2=I_3+I_4$ so that $T_1=T_2$. The output signal S is therefore periodic both on its regular portion $S_1$ and its irregular portion $S_2$.

According to an advantageous embodiment feature, the width $I_1$ of the regular north magnetic pole $P_1$ is equal to the width $I_4$ of the irregular south magnetic pole $P_4$ whereas the width $I_2$ of the regular south magnetic pole $P_2$ is equal to the width $I_3$ of the irregular north magnetic pole $P_3$.

In the illustrated example, the width $I_3$ of the irregular north magnetic pole $P_3$ accounts for 70% of the total width of a pair of irregular magnetic poles so that the width $I_4$ of the irregular south magnetic pole $P_4$ is equal to 30% of the total width of the pair of irregular poles.

In the illustrated example, the cyclic ratio $R_1$ is complementary to the cyclic ratio $R_2$ so that $R_1=1-R_2$. Of course, provision may be made for selecting cyclic ratios with different values and non-complementary values ($R_1 \neq 1-R_2$). For example, cyclic ratios such as $R_1=0.7$ and $R_2=0.4$ may be chosen.

In the foregoing description, the encoder 2 includes regular magnetic poles $P_1$, $P_2$ and irregular magnetic poles $P_3$, $P_4$. Further, the widths $I_1$, $I_2$ of the regular magnetic poles $P_1$, $P_2$ have different values, as well as the widths $I_3$, $I_4$ of the irregular magnetic poles $P_3$, $P_4$. It is clear that the object of the invention may be applied to an encoder 2 including a single category of pairs of magnetic poles $P_i$, $P_{i+1}$, i.e., either of the regular type or of the irregular type. It should be noted that in the case when the encoder 2 includes both categories of pairs of magnetic poles, one of the categories includes magnetic poles with different widths whereas the other category includes magnetic poles with different widths as this has been described above, or with equal widths so that the corresponding portion of the output signal has a balanced cyclic ratio, i.e., equal to 0.5.

Advantageously, the encoder 2, as described above, is intended to be mounted on a rotating target in the general sense, from which at least one position is determined. According to a preferred embodiment feature, the encoder 2 according to the invention is intended to be mounted on a drive pulley mounted at the output of the engine of a motor vehicle, i.e., on the distributor pulley or on one of the auxiliary pulleys. According to an advantageous feature, the encoder 2 is mounted on the drive pulley found in the axis of the crankshaft, in order to allow detection of the top dead centre for igniting a cylinder.

It should be noted that the object of the invention may also be applied to the making of a sensor including a magnetic ring provided with several irregular poles allowing several positions to be located. Advantageously, the magnetic ring for example includes four irregular poles with which the position of the cylinders of an engine may be located. In this case, the encoder is mounted and firmly secured to the camshaft of a motor vehicle engine. Of course, the encoder may be mounted on the camshaft with only one irregular pole.

According to another preferred embodiment feature, the encoder according to the invention is intended to be mounted inside a supporting plate of a dynamic seal gasket for a transmission shaft, mounted between the crankshaft and the gearbox of an engine of a motor vehicle. The encoder is driven into rotation by the transmission shaft and is mounted in a proximity relationship with detector cells mounted on the supporting plate of the seal gasket, so as to form a position sensor.

According to another preferred embodiment feature, the encoder is blocked in rotation on a shaft of an engine of a motor vehicle or is driven into rotation by the crankshaft or the camshaft of an engine of a motor vehicle, while being mounted inside the engine block of such a vehicle, in a proximity relationship with a detector cell, in order to form a position or velocity sensor.

The invention is not limited to the described and illustrated examples, as various changes may be provided thereto without departing from its scope.

The invention claimed is:

1. An encoder for a rotary position sensor, including a multipolar magnetic ring driven into rotation around its axis (x), and provided on its circumference with magnetic poles of a given sign ($P_i$) alternately positioned with magnetic poles of an opposite sign ($P_{i+1}$) so as to form at least one series of at least one pair of magnetic poles with a determined period ($T_i$), each said magnetic pole ($P_i$) of a given sign having a width $I_i$ and a magnetic polarization value $M_i$, with each magnetic pole of opposite sign ($P_{i+1}$) having a width $I_{i+1}$ different from width $I_i$ and a magnetic polarization value $M_{i+1}$, the magnetic poles having a polarization ($P_i$, $P_{i+1}$) such that $M_i \times I_i = M_{i+1} \times I_{i+1}$.

2. The encoder according to claim 1, including as magnetic poles ($P_i$, $P_{i+1}$), regular magnetic poles of the given sign ($P_1$) and regular magnetic poles of the opposite sign ($P_2$) so as to form a series of pairs of regular magnetic poles with the determined period ($T_1$), each regular magnetic pole ($P_1$) of the given sign having the width $I_1$ and the magnetic polarization value $M_1$ so that each regular magnetic pole of opposite sign ($P_2$) has the width $I_2$ different from width $I_1$ and a magnetic polarization value $M_2$, such that $M_1 \times I_1 = M_2 \times I_2$.

3. The encoder according to claim 2, including as magnetic poles ($P_i$, $P_{i+1}$), at least one magnetic singularity formed by at least one irregular magnetic pole of a given sign ($P_3$) having a width $I_3$ and a magnetic polarization value $M_3$ and by an irregular magnetic pole of opposite sign ($P_4$) having a width $I_4$ substantially equal to width $I_3$ and a magnetic polarization value $M_4$, so as to form a series of at least one pair of irregular magnetic poles with a determined period ($T_2$), the polarization of the irregular magnetic poles ($P_3$, $P_4$) being such that: $M_3 \times I_3 = M_4 \times I_4$.

4. The encoder according to claim 1, including as magnetic poles ($P_i$, $P_{i+1}$), at least one magnetic singularity formed by at least one irregular magnetic pole of a given sign ($P_3$) having a width $I_3$ and a magnetic polarization value $M_3$ and by an irregular magnetic pole of opposite sign ($P_4$) having a width $I_4$ different from width $I_3$ and a magnetic polarization value $M_4$, so as to form a series of at least one pair of irregular magnetic poles with a determined period ($T_2$), the polarization of the irregular magnetic poles ($P_3$, $P_4$) being such that: $M_3 \times I_3 = M_4 \times I_4$.

5. The encoder according to claim 4, including as magnetic poles ($P_i$, $P_{i+1}$), regular magnetic poles of the given sign ($P_1$) and regular magnetic poles of the opposite sign ($P_2$) so as to form the series of pairs of regular magnetic poles with determined period ($T_1$), each said regular magnetic pole ($P_1$) of given sign having width $I_1$ and magnetic polarization value $M_1$, and each regular magnetic pole of opposite sign ($P_2$) having width $I_2$ substantially equal to width $I_1$, and magnetic polarization value $M_2$, such that $M_1 \times I_1 = M_2 \times I_2$.

6. The encoder according to claim 4, wherein the regular ($P_1$, $P_2$) and irregular ($P_3$, $P_4$) magnetic poles are such that: $M_1 \times I_1 = M_2 \times I_2 = M_3 \times I_3 = M_4 \times I_4$.

7. The encoder according to claim 6, wherein the regular magnetic pole ($P_1$) is of the same sign as the irregular magnetic pole ($P_3$), and the regular magnetic pole ($P_2$) and the irregular magnetic pole ($P_4$) are of the same sign, opposite to the sign of the poles ($P_1$, $P_3$).

8. The encoder according to claim 6, wherein the regular ($P_1$, $P_2$) and irregular ($P_3$, $P_4$) magnetic poles are such that $I_1+I_2=I_3+I_4$, so that the period ($T_1$) of the regular magnetic poles is equal to the period ($T_2$) of the irregular magnetic poles.

9. The encoder according to claim 7, wherein the width $I_1$ of the regular magnetic pole ($P_1$) is equal to the width $I_4$ of the irregular magnetic pole ($P_4$), the width $I_2$ of the magnetic pole ($P_2$) being equal to the width $I_3$ of the irregular magnetic pole ($P_3$) so that the cyclic ratios for the regular and irregular magnetic poles are complementary.

10. A rotary position sensor including an encoder according to claim 1, having a multipolar magnetic ring which moves past at least one detector cell.

11. The rotary position sensor according to claim 10, wherein the encoder is blocked in rotation on a shaft of an engine of a motor vehicle.

12. The rotary position sensor according to claim 10, wherein the detector cell (3) is a mono-component detector cell.

13. The sensor according to claim 12, wherein the detector cell is a Hall effect cell, a differential Hall effect cell, a Hall effect cell with flux concentrator, a magneto-resistive cell or a giant magneto-resistive cell.

* * * * *